F. A. FROMMANN.
VEHICLE WHEEL.
APPLICATION FILED MAR. 17, 1913.
1,250,159.
Patented Dec. 18, 1917.
2 SHEETS—SHEET 1.
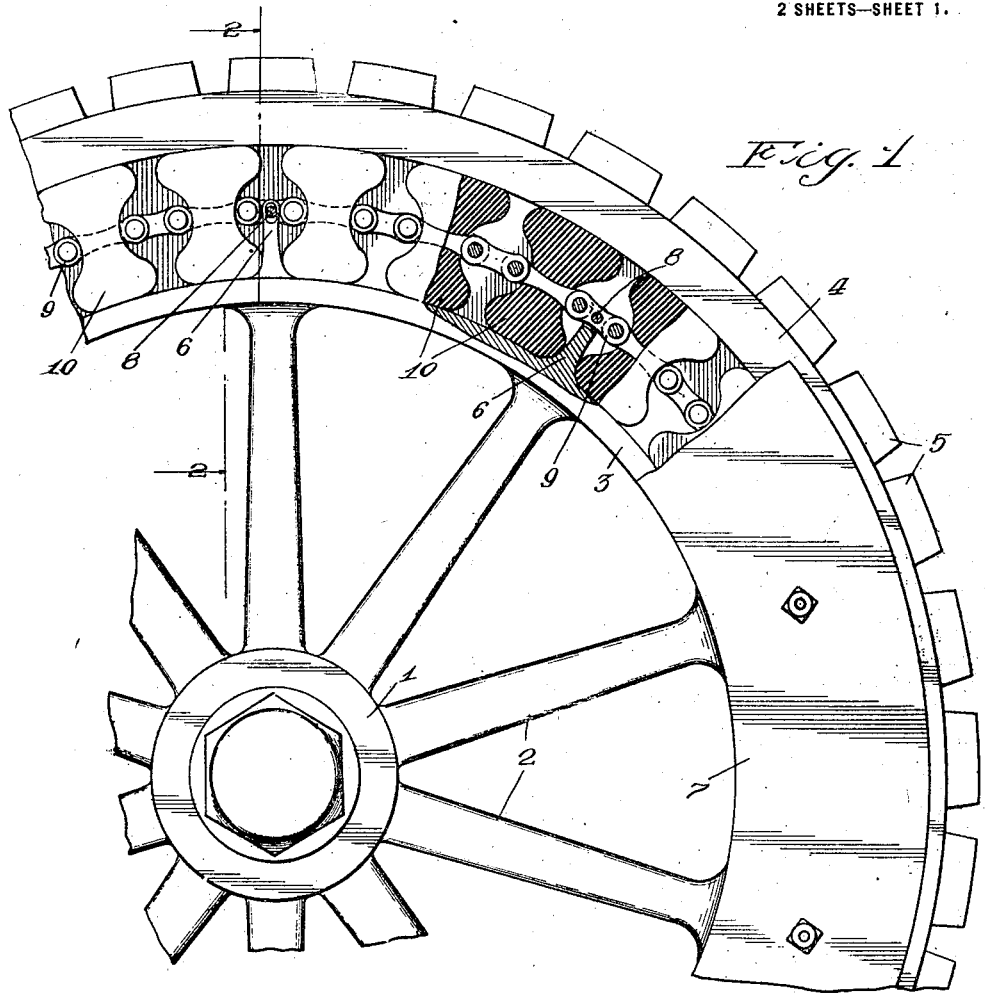
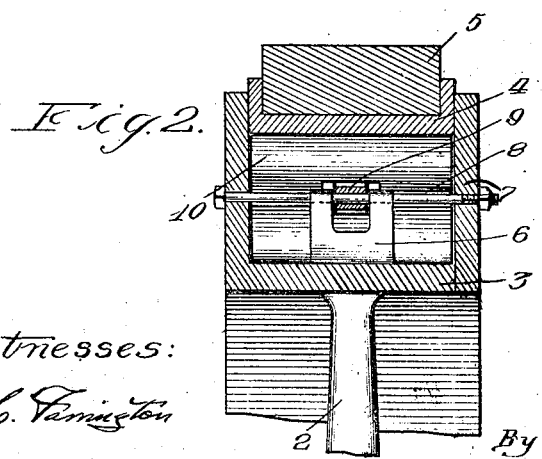
Witnesses:
Inventor
Franklin A. Frommann
By Lotz & Scheibl
Attys.

F. A. FROMMANN.
VEHICLE WHEEL.
APPLICATION FILED MAR. 17, 1913.

1,250,159.

Patented Dec. 18, 1917.
2 SHEETS—SHEET 2.

Witnesses:

Inventor
Franklin A. Frommann
By Lotz + Scheibh
Attys.

UNITED STATES PATENT OFFICE.

FRANKLIN A. FROMMANN, OF CHICAGO, ILLINOIS.

VEHICLE-WHEEL.

1,250,159.  Specification of Letters Patent.  Patented Dec. 18, 1917.

Application filed March 17, 1913. Serial No. 754,855.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

My invention relates to the class of vehicle wheels having a tire member floatingly carried by the hub member of the wheel, and more particularly to wheels of this class having side flanges for maintaining the floatingly related wheel parts in lateral alinement. In wheels of this class, it has been customary heretofore to interpose one or more cushioning elements between the hub and tire members of the wheel, and to fasten these cushioning elements either to the hub member, or to the tire member, or to both.

My present invention aims to provide a wheel in which the interposed cushioning elements are not secured either at their radially outward portions to the tire member of the wheel, nor at their radially inward portions to the hub member, but are floatingly carried with respect to both the hub and the tire members of the wheel.

Another object of my invention is to provide a wheel construction in which floatingly mounted resilient members will be limited in their movement circumferentially of the wheel with respect to either the hub or tire members, or both. A further object is to provide a wheel construction of the class mentioned in which the resilient elements will be mounted upon an articulated member, and in which the said articulated member will be detachably secured at radially separated intervals to either the hub or tire members of the wheel, or to both. Other objects will appear from the following specification and from the drawings, in which Figure —1— is a fragmentary side view, partly in section, of the wheel embodying my invention, some parts being broken away and others shown in section.

Fig. —2— is a partial section through Fig. 1 along the line 2—2.

Fig. —3— is a fragmentary circumferential central section of the articulated member of the wheel of Fig. 1 and of the resilient elements mounted thereon.

Fig. —4— shows an alternative embodiment of my invention.

Figure 3:
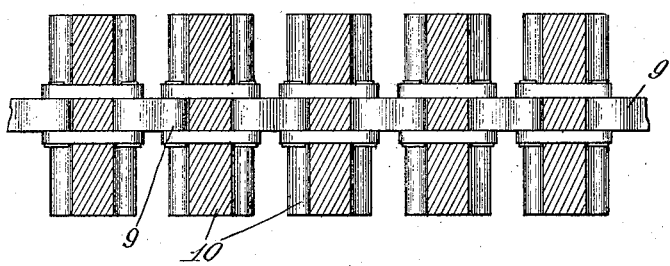
Figure 4:
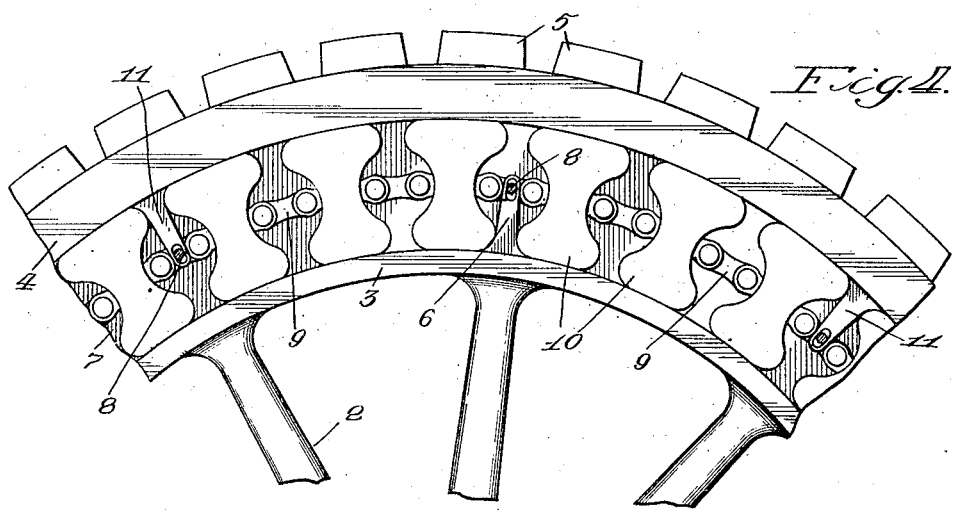
Figure 5:
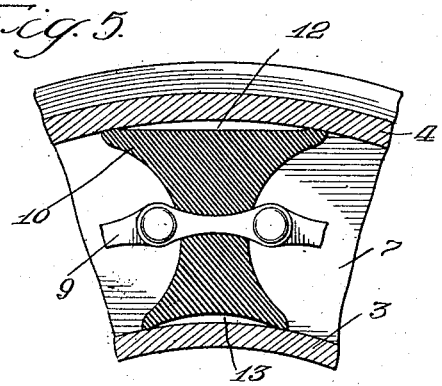

Fig. —5— is an enlarged sectional view through one of the resilient members of my wheel construction when there is no strain upon the wheel, the resilient members being of a shape alternative to that shown in Figs. 1 and 4.

Fig. —6— is a similar view showing the compression and distortion of the resilient member when the latter is used on a loaded wheel with the hub and tire members thereof rotating relatively in the direction of the arrows.

In the embodiment of Fig. 1, the wheel of my invention consists of a hub member comprising a hub 1 supporting a plurality of spokes 2, which spokes terminate in a circumferential rim 3. Radially outward of the rim 3 and normally concentric therewith is a tire member comprising a channel-sectioned rim 4 carrying a plurality of tread blocks 5. Projecting beyond the outer edge of the hub rim 3 and preferably radially in line with the spokes are spoke extensions, each having a transverse perforation normally spaced about midway between the outer surface of the rim 3 of the hub member and the inner surface of the rim 4 of the tire member of the wheel. At each side of the wheel the latter is provided with annular side flanges 7 secured to the rim 3 and between which the channel rim 4 is laterally confined and by which it is guided. The spoke extensions 6 are preferably bifurcated, thereby providing space between the forks for one of the links 9 of an articulated member, such as a link chain, which is held in position by a transverse bolt or pin 8. This articulated member preferably comprises a substantially endless chain of a suitable length for occupying a position about midway between the said rims 3 and 4 of the hub and tire members respectively. Mounted at intervals upon the links of the said articulated member, and desirably molded upon the same, are resilient members 10 of vulcanized rubber or other suitable material. Each of these resilient elements 10 is preferably circumferentially enlarged at or near each of its radial ends, thereby providing an increased bearing surface for contact with the rims 3 and 4 respectively.

It will be evident from Fig. 1 that the articulated member connecting the resilient elements will leave the latter free to be independently compressed and distorted to a considerable extent, also that the ability of the articulated member to move about its joints will permit the portion of this member intervening between its successive pivotal mountings upon the bolts 8 to move radially inward or outward. At the same time, the connection of the articulated member to the hub member of the wheel through the spoke extensions 6 will prevent the chain of resilient elements from moving to any considerable extent circumferentially of the wheel with respect to the hub member thereof.

While I have shown and described the cushion-carrying chain or flexible interposed member of my invention as fastened at intervals to the hub member of the wheel, I do not wish to be limited to this arrangement as the spoke extensions 6 might be eliminated and the chain carried entirely by the inwardly directed formations 11 upon the rim 4 of the tire member, as shown in Fig. 1. Or, if desired, the chain-fastening formations of the wheel may be formed alternately upon the tire and hub members of the wheel as also shown on Fig. 4.

Figure 6:
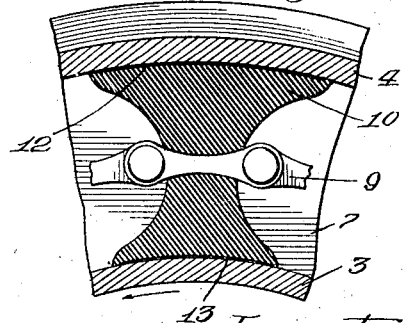

To avoid a slipping of the floatingly related hub and rim members of the wheel with respect to the portion of the resilient elements bearing radially against the same, I preferably provide recessed formations 12 and 13 at the radially outward and radially inward ends of the resilient elements respectively. When the wheel equipped with such cushioning elements is used under a strain, the compression upon them will squeeze out the air normally contained in the pockets between the recesses 12 and 13 and the respective adjacent rims 4 and 3, thereby affording circumferentially wide contact surfaces as shown in Fig. 6.

In doing so, the squeezing out of the air from the pockets will tend to create a partial vacuum in the pockets when the compressing strain is relaxed upon partial rotation of the wheel, whereupon the pressure of the outer air will coact with this partial vacuum to hold the ends of the cushions firmly against the adjacent rims. Consequently, the slipping of the cushioning elements with respect to the rims of the hub and tire members, and hence the resulting wear and friction will be greatly reduced. While I have shown and described the wheel of my invention in a particular embodiment, I do not wish to be limited to the details as pictured and described, it being obvious that many modifications might be made without departing from the spirit of my invention.

I claim as my invention:

1. In a vehicle wheel, a hub member, a tire member movable relative thereto, and a plurality of articulated members interposed therebetween and extending circumferentially of the said members; each of the said articulated members comprising a series of links secured at its respective ends to the said hub member, and large ended cushions carried by at least one of the said links and bearing in directions substantially radial of the wheel against the said hub and tire members respectively.

2. In a vehicle wheel, a hub member, a tire member movable with respect thereto, a plurality of articulated members interposed between the said hub and tire members and secured to one of the latter; and cushioning elements carried by the said articulated members and frictionally engaging the said hub and tire members, each of the said cushioning elements being enlarged at its radially opposite ends.

3. In a vehicle wheel, a hub member, a tire member movable with respect thereto, and a plurality of articulated members interposed therebetween circumferentially of the said members and each comprising a series of links, some of the said links equipped with resilient members having radial impingement upon the said hub and tire members respectively and larger at their contacting ends than at their points of engagement with said links, others of the said links connecting the said cushion-equipped links with one another and with radially projecting formations upon one of the members between which the said articulated members are interposed.

4. In a vehicle wheel, a hub member, a tire member movable with respect thereto, and a plurality of articulated members interposed therebetween and each comprising a series of links, some of the said links equipped with resilient portions having radial impingement upon the said hub and tire members respectively, others of the said links connecting the said cushion-equipped links with one another and with radially projecting formations upon one of the members between which the said articulated members are interposed; the said cushions being enlarged circumferentially of the wheel at points adjacent to their impingement with the said hub and tire members respectively.

5. In a wheel, a hub member; a tire member radially and circumferentially movable relative thereto; and an annularly disposed cushioning member interposed between the aforesaid members, the said cushioning member comprising an endless chain and hour-glass shaped in circumferential cross-section, cushions carried by a plurality of links of the said chain, the chain being non-rotatably secured to the said hub member and each of said cushions frictionally engaging both of said members.

6. In a vehicle wheel, a hub member equipped with a rim; a plurality of supporting members integral with the said rim and extending radially beyond the latter; a tire member radially and circumferentially movable with respect to the said hub member; and a plurality of flexibly connected cushioning members interposed in annular formation between the said rim and the tire member, each of the said cushioning members comprising a plurality of flexibly connected cushions adapted to be radially compressed between the rim and tire and connected at its respective ends to two of the said supporting members.

7. In a vehicle wheel, a hub member; a tire member movable relative thereto; guide means carried by one of the said members for preventing relative lateral motion; a plurality of radially disposed cushions interposed between the said hub and tire member, each of said cushions contracted intermediate of its radial ends in a direction circumferential of the wheel; a link mounted in the said contracted portion of each cushion; the said links flexibly connected to one another and non-rotatably connected to one of the members between which the said cushions are interposed.

8. In a wheel, a hub member, a rim fixed thereon, a tire member radially and circumferentially movable with respect thereto; a cushioning member comprising a plurality of articulated connectors floatingly interposed between the tire and rim and secured at a plurality of radially separated points to one of the members between which they are interposed, and cushions carried by a plurality of the said articulated members and adapted to yieldingly hold said tire relatively to the rim and frictionally engaging both thereof.

In testimony whereof I have signed my name in presence of two subscribing witnesses.

FRANKLIN A. FROMMANN.

Witnesses:
ALBERT SCHEIBLE,
M. M. BOYLE.

Copies of this patent may be obtained for five cents each, by addressing the "Commissioner of Patents, Washington, D. C."